United States Patent
Xu et al.

(10) Patent No.: US 10,165,549 B2
(45) Date of Patent: Dec. 25, 2018

(54) ALLOCATING MULTIMEDIA BROADCAST AND MULTICAST SERVICE SESSIONS

(71) Applicant: Telefonaktiebolaget LM Ericsson (publ), Stockholmn (SE)

(72) Inventors: Hawkins Xu, Täby (SE); Göran Hansson, Stockholm (SE); Björn Knuthammar, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 162 days.

(21) Appl. No.: 14/914,816

(22) PCT Filed: Feb. 8, 2016

(86) PCT No.: PCT/SE2016/050090
§ 371 (c)(1),
(2) Date: Feb. 26, 2016

(87) PCT Pub. No.: WO2017/138847
PCT Pub. Date: Aug. 17, 2017

(65) Prior Publication Data
US 2018/0049158 A1    Feb. 15, 2018

(51) Int. Cl.
H04W 72/00    (2009.01)
H04L 29/08    (2006.01)
(Continued)

(52) U.S. Cl.
CPC .............. *H04W 72/005* (2013.01); *H04L 1/00* (2013.01); *H04L 1/0017* (2013.01); *H04L 67/14* (2013.01);
(Continued)

(58) Field of Classification Search
CPC ........... H04W 72/005; H04W 72/1205; H04W 72/08; H04W 4/06; H04L 67/14
See application file for complete search history.

(56) References Cited

U.S. PATENT DOCUMENTS

2010/0329171 A1    12/2010    Kuo et al.
2012/0044850 A1*   2/2012    Wang ................. H04W 72/005
                                                    370/312
(Continued)

FOREIGN PATENT DOCUMENTS

EP    2785135 A1    1/2014
WO    2014111157 A1    7/2014

OTHER PUBLICATIONS

Huawei, "Unicast transmission in MBMS subframes", R2-093773, 3GPP TSG-RAN WG2 Meeting #66bis, [online] [retrieved on Aug. 4, 2016]. Retrieved from 3GPP database <URL: http://www.3gpp.org/ftp/tsg_ran/wg2_rl2/TSGR2_66bis/Docs/R2-093773.zip>; 3 pages.

(Continued)

*Primary Examiner* — Min Jung
(74) *Attorney, Agent, or Firm* — Rothwell, Figg, Ernst & Manbeck, p.c.

(57) ABSTRACT

It is provided a method for allocating a plurality of multimedia broadcast and multicast service, MBMS, sessions, the method being performed in one of a plurality of network nodes of an MBMS single frequency network. The method comprises the steps of: receiving an MBMS session event for one of the plurality of MBMS sessions; calculating a number of subframes needed within an allocation period to transmit the plurality of MBMS sessions of the single frequency network based on a guaranteed bitrate and quality of service, QoS, associated with each one of the MBMS sessions and a modulation and coding scheme, MCS, that is set for each QoS; determining a subframe pattern for the subframes within the allocation period; allocating the plurality of sessions within the subframe pattern according to a predetermined order, based on a guaranteed bitrate and; and transmitting a result of the allocating.

14 Claims, 4 Drawing Sheets

(51) Int. Cl.
*H04W 72/08* (2009.01)
*H04W 72/12* (2009.01)
*H04L 1/00* (2006.01)
*H04W 4/06* (2009.01)

(52) U.S. Cl.
CPC ....... *H04W 72/08* (2013.01); *H04W 72/1205* (2013.01); *H04L 2001/0093* (2013.01); *H04W 4/06* (2013.01)

(56) References Cited

U.S. PATENT DOCUMENTS

| | | | |
|---|---|---|---|
| 2012/0099509 A1* | 4/2012 | Ai | H04L 1/007 370/312 |
| 2012/0155363 A1* | 6/2012 | Moon | H04W 72/005 370/312 |
| 2013/0128756 A1* | 5/2013 | Zhang | H04W 4/06 370/252 |
| 2014/0086173 A1 | 3/2014 | Sadeghi et al. | |
| 2017/0070388 A1* | 3/2017 | Xu | H04W 4/06 |
| 2017/0188333 A1* | 6/2017 | Wu | H04W 4/06 |

OTHER PUBLICATIONS

International Search Report and Written Opinion dated Aug. 15, 2016 in International application No. PCT/SE2016/050090, 14 pages.
3GPP TS 36300, V13.1.0, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Sep. 2015, 254 pages.

* cited by examiner

ALLOCATING MULTIMEDIA BROADCAST AND MULTICAST SERVICE SESSIONS

CROSS-REFERENCE TO RELATED APPLICATIONS

This application is a 35 U.S.C. § 371 National Phase Entry Application from PCT/SE2016/050090, filed Feb. 8, 2016, and designating the United States.

TECHNICAL FIELD

The invention relates to a method, network nodes, a computer program and a computer program product for allocating a plurality of multimedia broadcast and multicast service, MBMS, sessions.

BACKGROUND

Cellular communication systems have become commonplace and are used by a large majority of people for person-to-person communication. Moreover, with the increasing use of smartphones, digitally distributed content is more and more consumed on wireless devices. While the delivery of a large part of such content, e.g. web pages, needs to be directly controllable by the user, the delivery of media content, such as video, can in many cases be shared by several users.

In order to increase efficiency of shared media consumption, point-to-multipoint systems such as broadcasting and/or multicasting can be used. In this way, network resources are shared between receiving wireless devices to a higher degree. A set of related standards for point-to-multipoint content delivery using cellular communication systems is 3GPP MBMS (3rd Generation Partnership Project-Multimedia Broadcast Multicast Service) and 3GPP eMBMS (evolved MBMS).

One concept in eMBMS is the MBSFN (MBMS Single Frequency Network) transmission, sometimes also referred to as multi-cell MBMS transmission using MBSFN operation-in a MBSFN area. An MBSFN area comprises multiple cells in which transmission of the same waveforms is performed at the same time. A property of MBSFN transmission is that all participating cells transmit the same content in a synchronized manner so it appears as one transmission to the wireless device. This gives the possibility for wireless devices to combine MBMS transmissions from multiple cells. Transmitting the same data to multiple wireless devices allows network resources to be shared.

EP 2 785 135 A1 discloses a method for resource allocation to MBMS services for MBSFN transmission in an MBSFN area in a mobile communication system. The resource allocation includes an assessment of a list of MBMS sessions to be scheduled for said MBSFN transmission, a method wherein a Sequence Number SN is used for said assessment, said SN determining the rank of an MBMS session in a sequence of MBMS sessions scheduled by one or more BM-SC(s) (Broadcast Multicast Service Center(s)) for said MBMS services, said rank of said MBMS session in said sequence being used in said assessment to determine a rank of said MBMS session in said list.

However, it would be of great benefit if resource allocation can be made more flexible.

SUMMARY

It is an object to provide better flexibility in how MBMS sessions are allocated in MBSFN which is still consistent when applied by different network nodes.

According to a first aspect, it is provided a method for allocating a plurality of multimedia broadcast and multicast service, MBMS, sessions, the method being performed in one of a plurality of network nodes of an MBMS single frequency network. The method comprises the steps of: receiving an MBMS session event for one of the plurality of MBMS sessions; calculating a number of subframes needed within an allocation period to transmit the plurality of MBMS sessions of the single frequency network based on a guaranteed bitrate and quality of service, QoS, associated with each one of the MBMS sessions and a modulation and coding scheme, MCS, that is set for each QoS; determining a subframe pattern for the subframes within the allocation period; allocating the plurality of sessions within the subframe pattern according to a predetermined order, based on a guaranteed bitrate and; and transmitting a result of the allocating.

The step of allocating may comprise allocating the MBMS sessions in an order based on their each network address parameter.

In the step of receiving an MBMS session event, the session event may be a session start event, a session update event or a session stop event.

The step of allocating may comprise, when the number of subframes needed within the allocation period exceeds the number of available subframes for MBMS sessions, proportionally allocating available subframes to different transport channels, wherein each transport channel is associated with at least one of the plurality of MBMS sessions, the proportional allocation being based on requested subframes for each MBMS session, grouped by the transport channels.

The step of determining the subframe pattern may comprise considering only using subframes which are configured for the MBMS single frequency network.

The step of determining the subframe pattern may comprise considering a preconfigured population strategy.

According to a second aspect, it is provided a network node for allocating a plurality of multimedia broadcast and multicast service, MBMS, sessions of an MBMS single frequency network, the network node comprising: a processor; and a memory storing instructions that, when executed by the processor, cause the network node to: receive an MBMS session event for one of the plurality of MBMS sessions; calculate a number of subframes needed within an allocation period to transmit the plurality of MBMS sessions of the single frequency network based on a guaranteed bitrate and quality of service, QoS, associated with each one of the MBMS sessions and a modulation and coding scheme, MCS, that is set for each QoS; determine a subframe pattern for the subframes within the allocation period; allocate the plurality of MBMS sessions within the subframe pattern according to a predetermined order; and transmit a result of the allocating.

The instructions to allocate may comprise instructions that, when executed by the processor, cause the network node to allocate the MBMS sessions in an order based on their each network address parameter.

In the instructions to receive an MBMS session event, the session event may be a session start event, a session update event or a session stop event.

The step instructions to allocate may comprise instructions that, when executed by the processor, cause the network node to, when the number of subframes needed within the allocation period exceeds the number of available subframes for MBMS sessions, proportionally allocate available subframes to different transport channels, wherein each transport channel is associated with at least one of the plurality of MBMS sessions, the proportional allocation being based on requested subframes for each MBMS session, grouped by the transport channels.

The instructions to determine the subframe pattern may comprise instructions that, when executed by the processor, cause the network node to consider only using subframes which are configured for the MBMS single frequency network.

The instructions to determine the subframe pattern may comprise instructions that, when executed by the processor, cause the network node to consider a preconfigured population strategy.

According to a third aspect, it is provided a network node comprising: means for receiving a multimedia broadcast and multicast service, MBMS, session event for one of a plurality of MBMS sessions of an MBMS single frequency network; means for calculating a number of subframes needed within an allocation period to transmit the plurality of MBMS sessions of the single frequency network based on a guaranteed bitrate and quality of service, QoS, associated with each one of the MBMS sessions and a modulation and coding scheme, MCS, that is set in the one of the plurality of network nodes for each QoS; means for determining a subframe pattern for the subframes within the allocation period; means for allocating the plurality of MBMS sessions within the subframe pattern according to a predetermined order; and means for transmitting a result of the allocating.

According to a fourth aspect, it is provided a computer program for allocating a plurality of multimedia broadcast and multicast service, MBMS, sessions of an MBMS single frequency network. The computer program comprises computer program code which, when run on a network node, causes the network node, to: receive an MBMS session event for one of the plurality of MBMS sessions; calculate a number of subframes needed within an allocation period to transmit the plurality of MBMS sessions of the single frequency network based on a guaranteed bitrate and quality of service, QoS, associated with each one of the MBMS sessions and a modulation and coding scheme, MCS, that is set for each QoS; determine a subframe pattern for the subframes within the allocation period; allocate the plurality of MBMS sessions within the subframe pattern according to a predetermined order; and transmit a result of the allocating.

According to a fifth aspect, it is provided a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein relate to an improved allocation of subframes for MBSFN. In particular, subframes are allocated consistently for all network nodes with a distributed MCE (Multi-cell/multicast Coordination Entity) topology, i.e. that each network node implements a distributed MCE functionality. This prevents inconsistencies in subframe allocation across network nodes. Moreover, great flexibility in configuring how the subframes should be allocated is provided using subframe patterns. Unallocated subframes can be used for other transmissions, thus freeing up capacity which would otherwise be unused.

Figure 1:
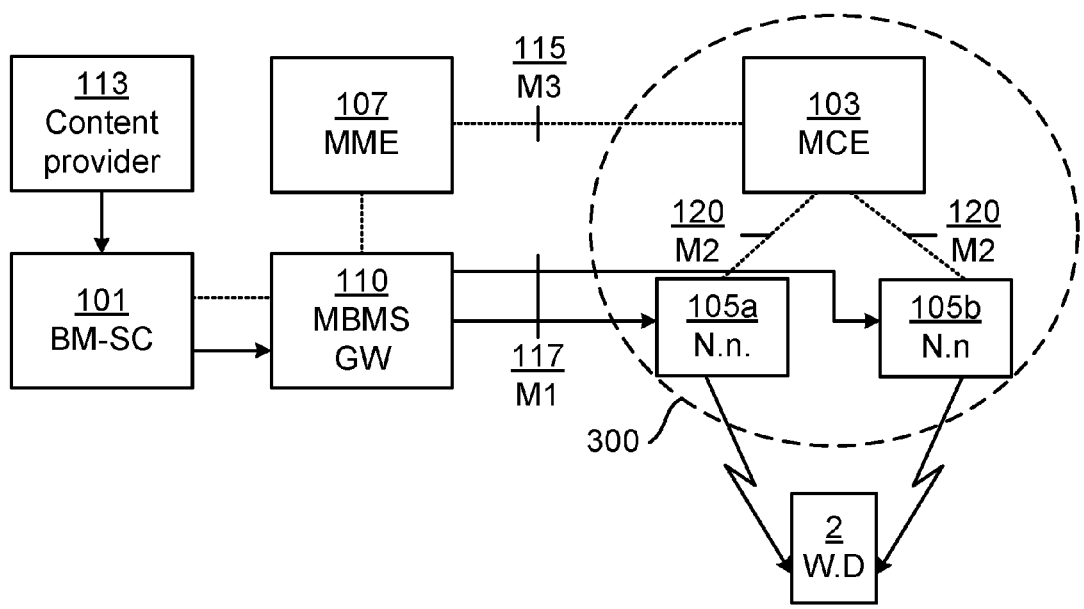
FIG. 1 is a schematic diagram illustrating an environment with a standalone MCE (Multi-cell/multicast Coordination Entity)

FIG. 1 is a schematic diagram illustrating an environment with a standalone MCE. It is to be noted that embodiments presented herein do not use a standalone MCE, but this is presented here for illustratory purposes. A wireless communication network 300 comprises one or more network nodes 105a-b, here each in the form of a radio base station such as an evolved Node B, also known as an eNode B or eNB. Each one of the network nodes 105a-b could also be in the form of a Node B, BTS (Base Transceiver Station) and/or BSS (Base Station Subsystem), etc., as long as the embodiments presented herein are applicable. The network nodes 105a-b provide radio connectivity to one or more wireless devices 2. The wireless device 2 shown here is capable of receiving a broadcast and/or a multicast content feed. The term wireless device is also known as mobile communication terminal, user equipment, mobile terminal, user terminal, user agent, machine-to-machine device etc., and can be, for example, what today are commonly known as a mobile phone, smart phone or a tablet/laptop with wireless connectivity or a fixed mounted terminal.

The wireless communication network 300 may e.g. comply with any one or a combination of LTE-SAE (Long Term Evolution-System Architecture Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the embodiments described hereinafter are applicable.

The wireless communication network 300 further comprises components to support broadcast content, in a broadcast or a multicast way, i.e. multiple wireless devices 2 can receive the same content in a point-to-multipoint fashion. This increases network efficiency, e.g. compared to point-to-point streaming, also known as unicast.

The components for broadcast comply with any suitable standard, e.g. 3GPP MBMS ($3^{rd}$ Generation Partnership Project Multimedia Broadcast Multicast Service), 3GPP MBMS Evolution, 3GPP IMB (Integrated Mobile Broadcast), 3GPP eMBMS (Evolved MBMS), DVB-H (Digital Video Broadcasting-Handheld), DVB-NGH (Digital Video Broadcasting-Next Generation Handheld), or any other current or future broadcast system over wireless networks, as long as the principles described hereinafter are applicable. In this document, embodiments are presented as applied in 3GPP MBMS release 6 or later, but it is to be understood that this does not imply that any other standard is excluded.

A Broadcast Multicast Service Center (BM-SC) 101 is provided to control the general flow of content from content providers 113 to the wireless devices 2, including providing both content and metadata at appropriate points in time.

An MBMS-GW no connects the BM-SC 101 with the wireless communication network 300 and network nodes 105a-b. Moreover, the MBMS-GW 110 is responsible for session management, etc.

In order not to obscure the concepts presented herein, other (sometimes optional) network nodes such as Radio Network Controller, GGSN (Gateway GPRS (general packet radio service) support node), SGSN (serving GPRS support node), are omitted from FIG. 1, but may be used as needed during operation. Other components not required to present the embodiments presented herein are omitted for reasons of clarity.

A Mobility Management Entity (MME) 107 is a control node for the wireless telecommunications network 300. An MBMS Gateway (MBMS GW) 110 is an entity that is provided between the BM-SC 101 and network nodes 105a-b. The function of the MBMS GW is to send/broadcast of MBMS packets to each one of the network nodes 105a-b transmitting the service. The MBMS GW 110 performs MBMS Session Control Signaling towards the radio access network, such as E-UTRAN (Evolved Universal Terrestrial Radio Access Network), via the MME 107. An MBMS session corresponds to an MBMS service, i.e. one media transmission.

In FIG. 1, an MCE (Multi-cell/multicast Coordination Entity) 103 is provided as logical standalone entity. The functions of the MCE 103 are admission control and the allocation of radio resources used by all network nodes 105a-b in the MBSFN network.

It is to be noted that while only two network nodes 105a-b are shown in FIG. 1 for the sake of simplicity, any suitable number of network nodes can be provided in the MBSFN.

A control plane interface (indicated by a dotted line) 115 between the MME 107 and the MCE 103 is denoted M3. The interface 117 between the MBMS GW 110 and the network nodes 105a-b is called M1, and is a user plane interface as indicated by the solid line. An interface 120 between the MCE 103 and the eNBs 105 is a control plane interface (indicated by the dotted line) called M2. IP multicast is used for point-to-multipoint delivery of user packets from the MBMS GW no to the network nodes 105a-b.

The point to multipoint delivery of content is an efficient way to delivery same content to large number of wireless devices in terms of frequency spectrum usage. In the radio network interfaces between the radio network nodes 105a-b and the wireless devices 2, this can be based on single frequency network (SFN) technology. This means that once the multiple signals from multiple cells are tightly synchronised, the multiple signals received from multiple cells (such as from different network nodes 105a-b) appear at the wireless devices as multi-paths of same signal transmission. In this way, the multiple signals do not interfere with each other but contribute to a useful signal which could be combined to enhance received signal strength.

With the standalone MCE 103, the MCE 103 controls the allocation of radio resources used by all network nodes 105a-b in the MBSFN for the MBSFN transmission. Hence, the transmission of the allocation of radio resources to the wireless devices in the same MBSFN area is performed in the same manner by all network nodes 105a-b.

Figure 2:
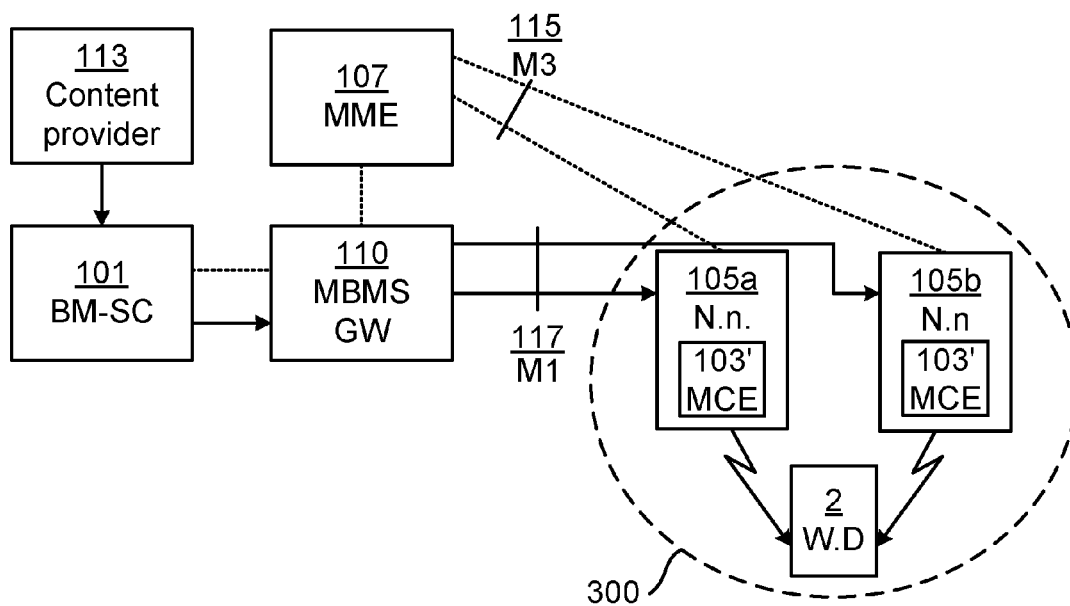
FIG. 2 is a schematic diagram illustrating an environment with distributed MCEs in which embodiments presented herein can be applied.

FIG. 2 is a schematic diagram illustrating an environment with distributed MCEs in which embodiments presented herein can be applied. The main difference in FIG. 2 compared to FIG. 1 is that the MCE function is distributed to the network nodes 105a-b in distributed MCEs 103' instead of in a standalone device. The distributed MCEs 103' form part of the respective network nodes 105a-b, using software and/or hardware components of the network nodes 105a-b. The M3 interface 115 is here provided between the MME 107 and each one of the network nodes 105a-b housing the distributed MCEs 103'.

In this alternative, the allocation of radio resources for the radio transmission can be configured by another configuration node, such as, by an Operation Support Systems (OSS) node. It is then up to each of the network nodes 105a-b in the same MBSFN area to transmit the allocation of radio resources to wireless devices.

One advantage of the distributed MCEs 103' is that no extra node (the MCE) is required to coordinate the corresponding network nodes, simplifying network architecture and reducing deployment cost compared to the standalone MCE of FIG. 1.

In the prior art, the distributed MCEs 103' can end up with non-coherent allocations of radio resources, such as subframes, to MBMS sessions, which may result in failure in the reception of the MBSFN transmission by the wireless devices.

As is explained in more detail below, embodiments presented herein result in consistent allocation of subframes to MBMS sessions across all network nodes of the MBSFN. Moreover, a flexibility of allocation is achieved using subframe patterns.

Figure 3:
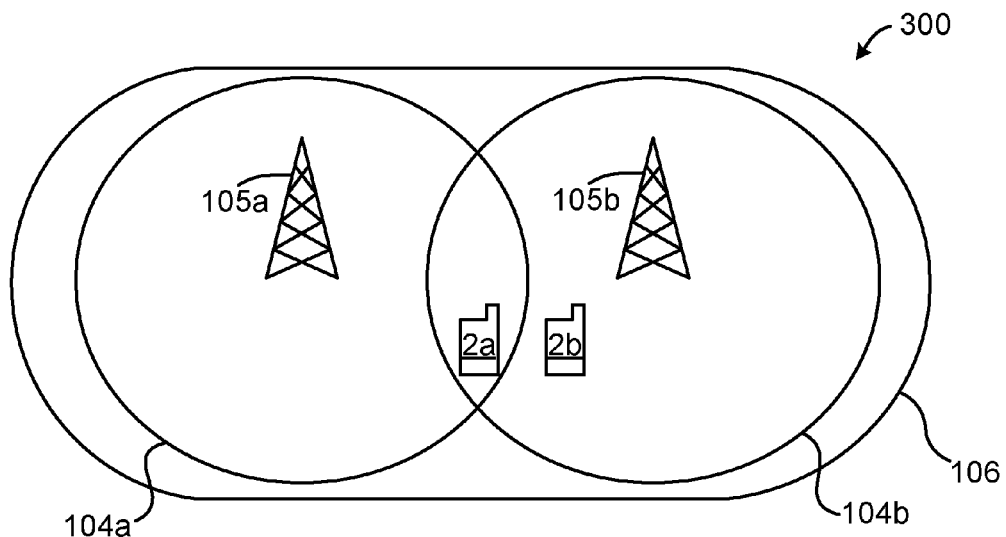
FIG. 3 is a schematic diagram illustrating an MBSFN which can be implemented in the environment of FIG. 2.

FIG. 3 is a schematic diagram illustrating an MBSFN 106 which can be implemented in the environment of FIG. 2. The wireless telecommunications network 300 comprises the first network node 105a serving a first cell 104a and the second network node 105b serving a second cell 104b. Each one of the first network node 105a and the second network node 105b is of the type shown in FIG. 2, i.e. comprising distributed MCE functionality.

The first cell 104a and the second cell 104b are part of the MBSFN area 106. In the example shown in FIG. 3, a first wireless device 2a is located in an overlapping area of the two cells 104a-b while a second wireless device 2b is located in the second cell 104b.

In this overlapping area, the wireless device 2a should receive synchronised MBMS transmissions from both the first network node 105*a* and the second network node 105*b*, to thereby increase received signal strength.

Unfortunately, when having a conventional distributed MCE functionality, each network node implementing distributed MCE is unaware of how the allocation of radio resources is transmitted to the wireless devices by another network node implementing distributed MCE for an MBSFN transmission in the same MBSFN area. It has been noted that differing or arbitrary, i.e. non-coherent, transmissions of the allocation of radio resources by two different network node implementing distributed MCE to the wireless devices may result in failure in the reception of the MBSFN transmission at the wireless devices. In order to secure coherent transmissions, one conventional method is to pre-configure the sub-frame usage for each MBSFN, and each network node implementing distributed MCE uses the pre-configured sub-frame usage regardless how many MBMS sessions are running and the bandwidth requirements for those. The conventional method will mean radio resources are wasted when only a part of the preconfigured resources are needed. Moreover, this puts great demand on the radio resource planning and provisioning in order to have the right level of radio resource configured for eMBMS.

A new solution is provided by the embodiments described in the following by having one or a set of pre-configured MBSFN sub-frame pattern(s) and a sequence of supported QCI (Quality of Service (QoS) Class Identifier) and the corresponding channel encoding parameters, e.g. MCS (Modulation and Coding Scheme) in network nodes 105*a*, 105*b*, based on the characteristics (QCI, GBR (Guaranteed Bitrate)) of all current MBMS sessions. Each network node 105*a*, 105*b* then uses the same method to calculate required number of subframes and derive the needed MBSFN sub-frame pattern which is a subset of the pre-configured MBSFN sub-frame pattern(s). In addition, network nodes can use a method to independently come out with the same order of the logic channels.

The solution ensures that the MBSFN area configuration and MCH (Multicast Channel) scheduling information (MSI) is the same across all network nodes, and only the needed radio resources (sub-frames) are used for MBMS services. Radio resources (sub-frames) not allocated to the MBSFN in the preconfigured pattern can then be used by other services like unicast services. This greatly improves efficiency and flexibility when transmitting MBMS sessions using MBSFN.

Figure 4:
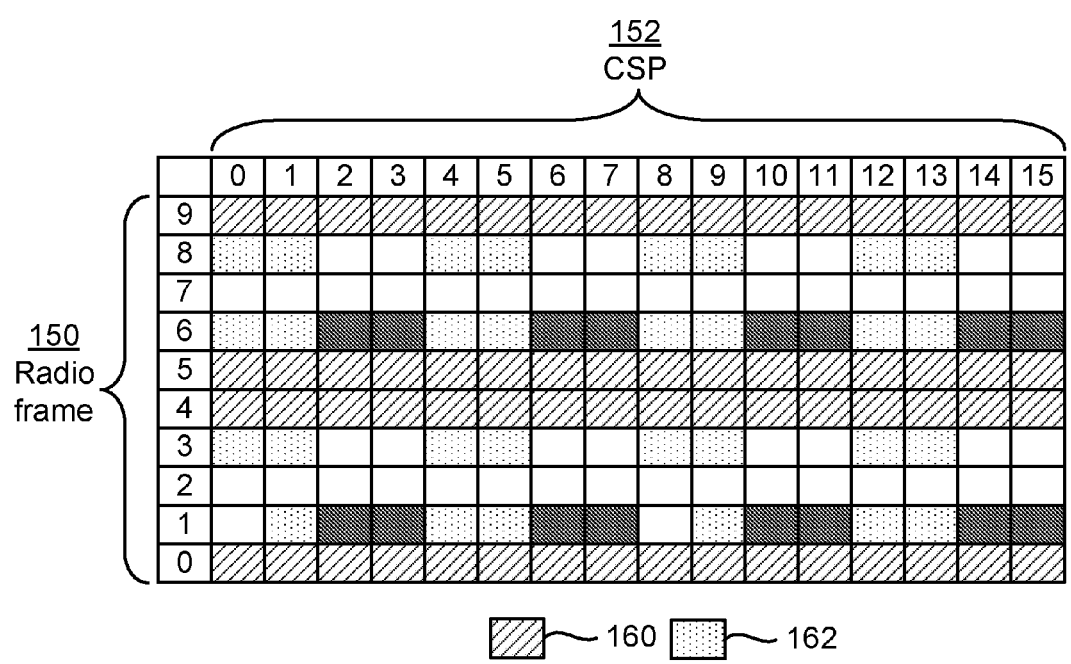
FIGS. 4-6 are schematic diagrams illustrating subframe allocation according to various embodiments which can be applied in the MBSFN of FIG. 3.
Figure 5:
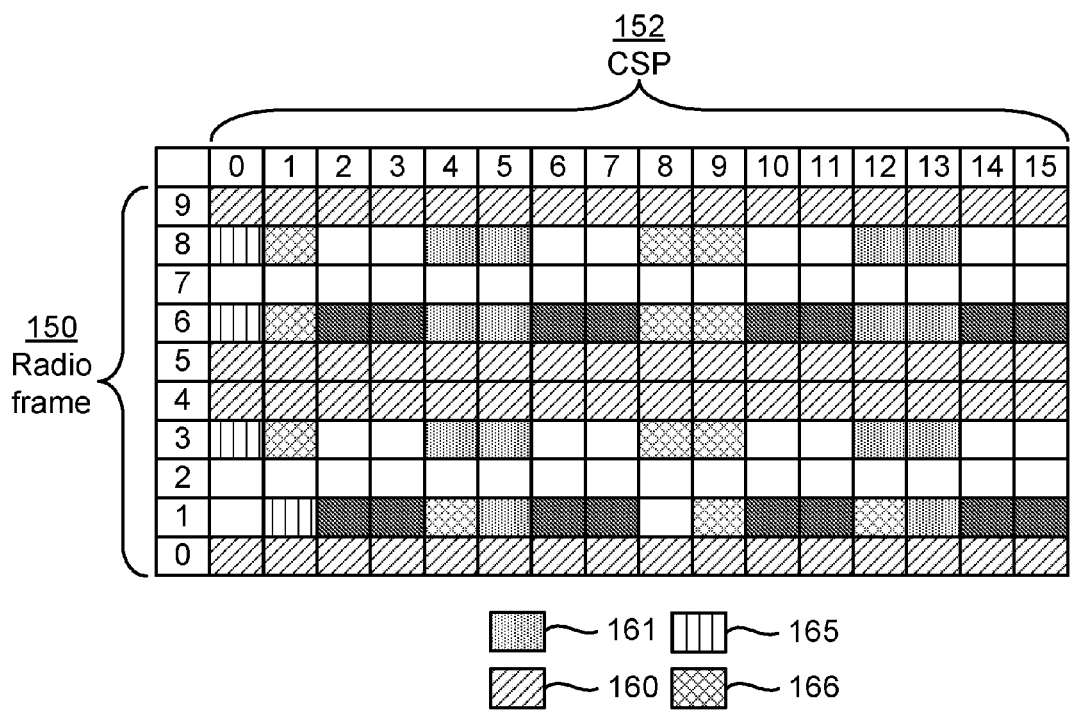
Figure 6:
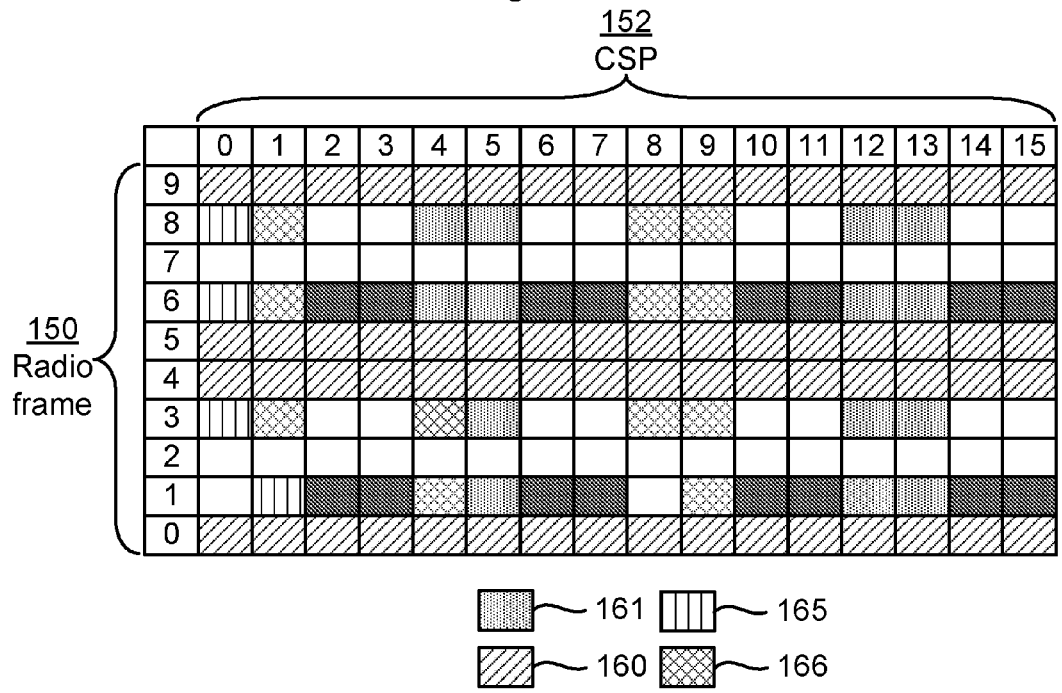

FIGS. 4-6 are schematic diagrams illustrating subframe allocation according to various embodiments which can be applied in the MBSFN of FIG. 3.

Looking first to FIG. 4, each column represents one radio frame 150, divided in subframes (in this example). Sixteen radio frames 150 make up one CSP (Common sub-frames allocation Period, a.k.a. commonSF-AllocPeriod) 152. Each radio frame 150 is 10 ms whereby the CSP 152 is 16×10 ms=160 ms long. A certain bandwidth for an MBMS session thus corresponds to a certain number of subframes in the CSP 152, when applying a Modulation and Coding Scheme (MCS) which is associated with the MBMS session.

In FIG. 4, the rightward slanting subframes are blacklist subframes 160 which are not to be available for eMBMS according to 3GPP. The dotted subframes are whitelist subframes 162 which are potential subframes for the MBSFN, as preconfigured. FIG. 4 illustrates the maximum number of frames that are available for the MBSFN.

The whitelist subframes 162 can be expressed as a combination of two four-frame subframe patterns.

The first subframe pattern is defined by the following:
Radio frame allocation period: 8
Radio frame allocation offset: 0
Four frames: 001101 101101 000000 000000

This implies that the first configuration, having an offset of 0, starts in subframe 0 and has a pattern for subframes 123678 (corresponding to the six subframes which are not part of the blacklist subframes 160): 001101 in radio frame 0,101101 in radio frame 1,000000 in radio frame 2,000000 in radio frame 3. The pattern is repeated with a periodicity of 8, whereby radio frame 8 has the same configuration as radio frame 0, radio frame 9 has the same configuration as radio frame 1, etc.

The second subframe pattern is defined by the following:
Radio frame allocation period: 8
Radio frame allocation offset: 4
Four frames: 101101 101101 000000 000000

This implies that the first configuration, having an offset of 4, starts in subframe 4 and has a pattern for subframes 123678 (the subframes which are not part of the blacklist subframes 160): 101101 in radio frame 4,101101 in radio frame 5,000000 in radio frame 6,000000 in radio frame 7. The pattern is repeated with a periodicity of 8, whereby radio frame 12 has the same configuration as radio frame 4, radio frame 13 has the same configuration as radio frame 5, etc.

Hence the two subframe patterns define the whitelist subframes 162.

Table 1 defines a set of MBMS sessions in an example used in the MBSFN herein for illustration purposes:

TABLE 1 example of MBMS sessions

| Session no | TMGI | GBR | QCI | IP Address | IP Port |
|---|---|---|---|---|---|
| 1 | 1 | 1 | 2 | 10.2.0.1 | 5001 |
| 2 | 2 | 2 | 2 | 10.2.0.2 | 5000 |
| 3 | 3 | 3 | 2 | 10.2.0.2 | 5001 |
| 4 | 4 | 4 | 1 | 10.2.0.1 | 5000 |

Where TMGI is Temporary Mobile Group Identity, GBR is Guaranteed BitRate, QCI is Quality of Service (QoS) Class Identifier), and IP is Internet Protocol.

Looking now to FIG. 5, the network node calculates that twelve subframes (in the CSP 152) are required for transmitting sessions 1-3 (using a first MCH which is associated with QCI 2 and a corresponding data MCS2) and four subframes are required for transmitting session 4 (using a second MCH which h is associated with QCI 1 and a corresponding data MCS1). The sessions are grouped together in MCHs by QCI since each MCH can only have one MCS. In total, sixteen subframes are then needed for the four sessions using two MCHs. This means that for this CSP, there are fourteen subframes which are available for other services.

The allocation within the available subframes here follows a population strategy which populates according to the subframe pattern first, secondly by subframe and finally by radio frame.

To implement the use of sixteen subframes, two subframe patterns are again used. Since subframe is to be populated first, the available subframes of the first subframe are populated first.

The first subframe pattern is then defined by the following:
  Radio frame allocation period: 8
  Radio frame allocation offset: 0
  Four frames: 001101 101101000000 000000

The subframe is provided twice in the CSP since the radio frame allocation period is eight and there are sixteen radio frames in the CSP 152, implying that there are fourteen frames defined by the first subframe pattern. Since there are more subframes needed (sixteen) than available in the CSP 152 for the first subframe pattern, the first subframe pattern is identical to the one mentioned above with reference to FIG. 4.

There are now two subframes (16-14) left to allocate, for which the second subframe pattern needs to be used.

The second subframe pattern (being a subset of the second subframe pattern described above with reference to FIG. 4) is then defined by the following:
  Radio frame allocation period: 8
  Radio frame allocation offset: 0
  Four frames: 100000 000000 000000 000000

The subframe is provided twice in the CSP since the radio frame allocation period is eight and there are sixteen radio frames in the CSP 152, implying that there are two frames defined by the first subframe pattern (within the CSP).

Since the population strategy it to populate the subframe pattern first, secondly by subframe and finally by radio frame, after the first subframe pattern has been populated first, the second subframe is defined such that both subframes are allocated in the first available subframe, here subframe 1, i.e. at radio frame 4, subframe 1 and radio frame 12, subframe 1.

The first MCH 165 and the second MCH 166 are then allocated in order in the subframes defined by the subframe patterns. Within the MCHs (or only the second MCH 166 in this example) multiple MBMS sessions are allocated in order, e.g. based on network address parameter(s) as described below. Remaining subframes 161 not allocated to any MCHs can be allocated for other purposes.

Looking now at FIG. 6, this is similar to FIG. 5, but here the population strategy it to populate the subframe pattern first, secondly by radio frame and finally by subframe. Since subframe pattern is populated first, the first subframe pattern is identical to that described above with reference to FIG. 5.

However, for the second subframe pattern, radio frames should be populated before subframes. Hence, the two subframes which need to be allocated are allocated in the first available radio frame, here radio frame 4. This results in allocations in radio frame 4, subframe 1 and radio frame 4, subframe 3.

The second subframe pattern is then defined here as:
  Radio frame allocation period: 16
  Radio frame allocation offset: 0
  Four frames: 101000 000000 000000 000000

Note that with the radio frame allocation period of sixteen and the two allocated subframes, there is no repetition of the second subframe pattern within the CSP 152, resulting in two subframes from the second subframe pattern in the CSP.

It is thus shown here how different population strategies result in different allocations of subframes in FIG. 5 and FIG. 6.

Figure 7:
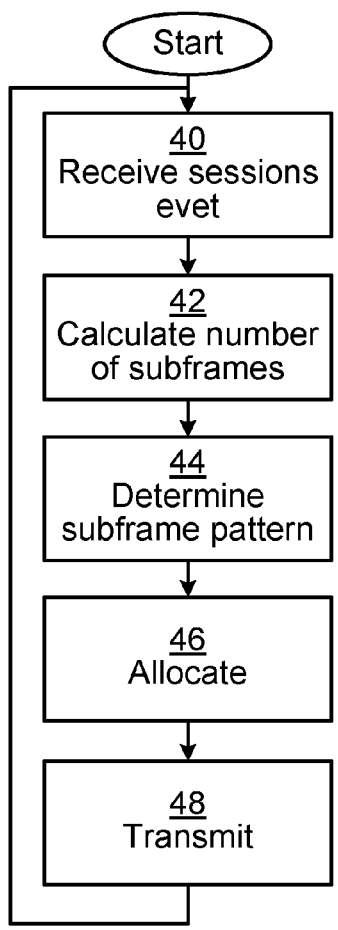
FIG. 7 is a flow chart illustrating a method for allocating a plurality of MBMS sessions in an MBSFN, such as the MBSFN of FIG. 2 or 3.

FIG. 7 is a flow chart illustrating a method for allocating a plurality of MBMS sessions in an MBSFN, such as the MBSFN of FIG. 3. The method is performed in each one of the network nodes of an MBSFN, e.g. as illustrated in FIGS. 2 and 3 and described above.

In a receive session event step 40 an MBMS session event for one of the plurality of MBMS sessions is received. For instance, the session event can be any one of a session start event, a session update event or a session stop event. This triggers the allocation method.

In a calculate number of subframes step 42, a number of subframes is calculated which is needed within an allocation period (see CSP 152 of FIGS. 4-6 and described above) to transmit the plurality of MBMS sessions of the single frequency network. This calculation is based on the GBR and QoS associated with each one of the MBMS sessions. Moreover, the MCS that is set for each QoS is also used for this calculation.

Hence, the network node calculates the number of subframes needed for all the current MBMS sessions. In the example, sessions 1, 2 and 3 have the QoS requirement as QCI2, and the network node uses QCI to MCS mapping to find out that MCS2 is required to provide the service bit rate GBR1+GBR2+GBR3 for the three sessions. With the encoding scheme specified in 3GPP 36.213, network node calculates the number of subframes are needed in one CSP cycle for providing the service bit rate GBR1+GBR2+GBR3, in this example twelve. With the same logic, the network node can calculate the number of subframes needed for session 4 in order to provide GBR 4 service bit rate with MCS1. After calculating the needed subframes for all the ongoing services, network node knows the total number of subframes which are needed in the current stage, i.e. 16 subframes in the example.

In a determine subframe pattern step 44, one or more subframe patterns are determined for the subframes within the allocation period. The subframe patterns defines the subframes which are to be used for the MBMS sessions in the allocation period. Remaining subframes can be used for other purposes, thus increasing capacity.

Optionally, this step comprises considering only using subframes which are configured for the MBMS single frequency network, e.g. the white list subframes 162 of FIG. 4, which can be preconfigured to represent the maximum available number of subframes in the allocation period.

Optionally, this step comprises considering a preconfigured population strategy, e.g. populate by subframe pattern first, followed by frame number or subframe number, etc.

In an allocate step 46, the plurality of sessions within the subframe pattern are allocated according to a predetermined order, based on a guaranteed bitrate.

Optionally, this step comprises allocating the MBMS sessions in an order based on their each network address parameter.

Optionally, this step comprises handling a congestion issue, i.e. when the number of subframes needed within the allocation period exceeds the number of available subframes for MBMS sessions. In such a case, available subframes are proportionally allocated to different transport channels (MCHs). As described above, each transport channel is associated with at least one of the plurality of MBMS sessions. The proportional allocation is based on requested subframes for each MBMS session, grouped by the transport channels.

In one embodiment, the network node configures the indication of the MTCHs (Multicast Traffic CHannels) in the MBSFN area configuration information and in the MSI based on a combination of the network multicast address and/or the Tunnel End Point ID(TEID) of each MBMS session. The order in which each MBMS session is allocated within each transport channel (e.g. MCH) is based on their respective network address parameters, such as multicast address and port number. This ensures that any wireless device combining eMBMS transmissions from multiple network nodes will receive the same content allocated in the same order, i.e. coherently, since all MTCHs will be in the same order irrespective from which of the network nodes the eMBMS transmissions are sent.

The order of the logical channel identities of the MTCHs is calculated based on an increasing order or a decreasing order of a combination of the network multicast address and the network port of each MBMS session. The combination of the network multicast address and the network port can be any math calculation of the two values, as long as the operation can secure a consistent and unique result as the network multicast address and the network port combination. In some embodiments, the network node only uses the network multicast address or the TEID, since the specific setup already can secure the uniqueness with one of the values.

By configuring the indication of the MTCHs in the MBSFN area configuration information based on a combination of the network multicast address and/or the TEID of each MBMS session, it should also be understood that the network node inherently will schedule the MTCHs based on the same order (within the MCH) since the scheduling order is set based on the MBSFN area configuration information.

In a transmit step 48, a result of the allocating is transmitted. This allows any wireless devices within the MBSFN to receive indication of the allocation to thereby extract the relevant MBMS session.

This method gives great flexibility in how the subframes are assigned in the CSP. This allows the MBSFN subframes e.g. to be assigned to adapt to other services transmitted on other subframes. In other words, depending on how the allocation of subframes is done for MBSFN, different subframes are made available for other services. Hence, the allocation of MBSFN subframes (using subframe pattern(s) and optionally population strategy) can be configured appropriately and is still consistent across the MBSFN.

Figure 8:
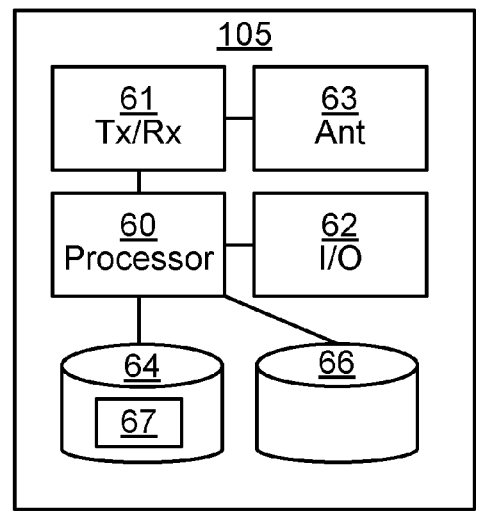
FIG. 8 is a schematic diagram illustrating components of any of the network nodes of FIG. 2 or 3.

FIG. 8 is a schematic diagram illustrating components of any of the network nodes 105*a-b*, of FIG. 2 or 3, here represented by a single network node 105. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIG. 7 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The network node 105 further comprises an I/O interface 62 for communicating with other external entities. Optionally, the I/O interface 62 also includes a user interface.

A transceiver 61 comprises suitable analogue and digital components to allow signal transmission and signal reception with a wireless device using one or more antennas 63.

Other components of the network node 105 are omitted in order not to obscure the concepts presented herein.

Figure 9:
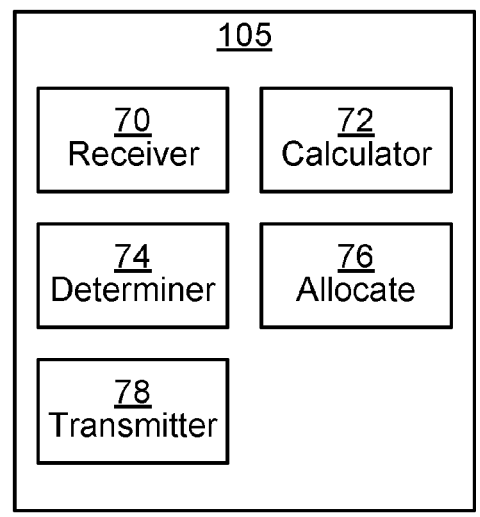
FIG. 9 is a schematic diagram illustrating functional modules of any of the network nodes of FIG. 2 or 3.

FIG. 9 is a schematic diagram illustrating functional modules of any of the network nodes of FIG. 2 or 3. The modules are implemented using software instructions such as a computer program executing in the network node 105. The modules correspond to the steps in the methods illustrated in FIG. 7.

A receiver 70 corresponds to step 40, a calculator 72 corresponds to step 42, a determiner corresponds to step 44, an allocator 76 corresponds to step 46 and a transmitter 78 corresponds to step 48.

Figure 10:
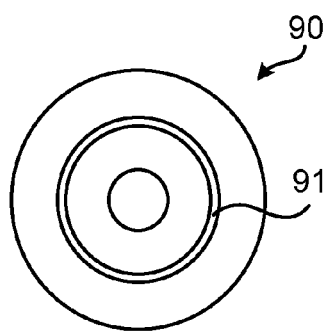
FIG. 10 shows one example of a computer program product comprising computer readable means.

FIG. 10 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 8. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for allocating a plurality of multimedia broadcast and multicast service (MBMS) sessions, the method being performed in one of a plurality of network nodes of an MBMS single frequency network, the method comprising the steps of:

receiving an MBMS session event for one of the plurality of MBMS sessions;

calculating a number of subframes needed within an allocation period to transmit the plurality of MBMS sessions of the single frequency network based on a guaranteed bitrate and quality of service (QoS) associated with each one of the MBMS sessions and a modulation and coding scheme (MCS) that is set for each QoS;

deriving a subframe pattern for the subframes within the allocation period;

allocating the plurality of sessions within the subframe pattern according to a predetermined order, based on a guaranteed bitrate; and transmitting a result of the allocating.

2. The method according to claim 1, wherein the step of allocating comprises allocating the MBMS sessions in an order based on their each network address parameter.

3. The method according to claim 1, wherein in the step of receiving an MBMS session event, the session event is a session start event, a session update event or a session stop event.

4. The method according to claim 1, wherein the step of allocating comprises, when the number of subframes needed within the allocation period exceeds the number of available subframes for MBMS sessions, proportionally allocating available subframes to different transport channels, wherein each transport channel is associated with at least one of the plurality of MBMS sessions, the proportional allocation being based on requested subframes for each MBMS session, grouped by the transport channels.

5. The method according to claim 1, wherein the step of determining the subframe pattern comprises using subframes which are configured for the MBMS single frequency network.

6. The method according to claim 1, wherein the step of determining the subframe pattern comprises using a preconfigured population strategy.

7. A network node for allocating a plurality of multimedia broadcast and multicast service (MBMS) sessions of an MBMS single frequency network, the network node comprising:
- a processor; and
- a memory storing instructions that, when executed by the processor, cause the network node to:
  calculate a number of subframes needed within an allocation period to transmit the plurality of MBMS sessions of the single frequency network based on a guaranteed bitrate and quality of service (QoS) associated with each one of the MBMS sessions and a modulation and coding scheme (MCS) that is set for each QoS;
  derive a subframe pattern for the subframes within the allocation period;
  allocate the plurality of MBMS sessions within the subframe pattern according to a predetermined order; and transmit a result of the allocating.

8. The network node according to claim 7, wherein the instructions to allocate comprise instructions that, when executed by the processor, cause the network node to allocate the MBMS sessions in an order based on their each network address parameter.

9. The network node according to claim 7, wherein the instructions include instructions for processing a received MBMS session event for one of the plurality of MBMS sessions, wherein the session event is one of: a session start event, a session update event, and a session stop event.

10. The network node according to claim 7, wherein, when the number of subframes needed within the allocation period exceeds the number of available subframes for MBMS sessions, the network node is configured to proportionally allocate available subframes to different transport channels, wherein each transport channel is associated with at least one of the plurality of MBMS sessions, the proportional allocation being based on requested subframes for each MBMS session, grouped by the transport channels.

11. The network node according to claim 7, wherein the instructions to determine the subframe pattern comprise instructions that, when executed by the processor, cause the network node to use subframes which are configured for the MBMS single frequency network.

12. The network node according to claim 7, wherein the instructions to determine the subframe pattern comprise instructions that, when executed by the processor, cause the network node to use a preconfigured population strategy.

13. A network node comprising:
- a receiver for receiving a multimedia broadcast and multicast service (MBMS) session event for one of a plurality of MBMS sessions of an MBMS single frequency network; and
- a processor for: calculating a number of subframes needed within an allocation period to transmit the plurality of MBMS sessions of the single frequency network based on a guaranteed bitrate and quality of service (QoS) associated with each one of the MBMS sessions and a modulation and coding scheme (MCS) that is set in the one of the plurality of network nodes for each QoS;
  deriving a subframe pattern for the subframes within the allocation period;
  and allocating the plurality of MBMS sessions within the subframe pattern according to a predetermined order; and
- a transmitter for transmitting a result of the allocating.

14. A computer program product comprising a non-transitory computer readable medium storing a computer program for allocating a plurality of multimedia broadcast and multicast service (MBMS) sessions of an MBMS single frequency network, the computer program comprising computer program code which, when run on a network node, causes the network node, to:
  receive an MBMS session event for one of the plurality of MBMS sessions;
  calculate a number of subframes needed within an allocation period to transmit the plurality of MBMS sessions of the single frequency network based on a guaranteed bitrate and quality of service (QoS) associated with each one of the MBMS sessions and a modulation and coding scheme (MCS) that is set for each QoS;
  derive a subframe pattern for the subframes within the allocation period;
  allocate the plurality of MBMS sessions within the subframe pattern according to a predetermined order; and transmit a result of the allocating.

* * * * *